US006907147B2

United States Patent
Crafts et al.

(10) Patent No.: US 6,907,147 B2
(45) Date of Patent: Jun. 14, 2005

(54) METHOD AND APPARATUS FOR ALIGNING AND ORIENTING POLARIZATION MAINTAINING OPTICAL FIBERS

(75) Inventors: Douglas E. Crafts, San Jose, CA (US); Duane Cook, San Jose, CA (US); Arne Schonert, San Jose, CA (US); Steve Swain, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 750 days.

(21) Appl. No.: 09/821,935

(22) Filed: Mar. 30, 2001

(65) Prior Publication Data

US 2005/0100261 A1 May 12, 2005

(51) Int. Cl.[7] .................................................. G02B 6/36
(52) U.S. Cl. .............................. 385/11; 385/53; 385/90
(58) Field of Search ............................ 385/11, 39, 100, 385/60, 78, 90–94, 53, 76–77; 65/385

(56) References Cited

U.S. PATENT DOCUMENTS

2002/0129623 A1 * 9/2002 Nonomura et al. ............ 65/385

* cited by examiner

*Primary Examiner*—Frank G. Font
*Assistant Examiner*—Michael P. Mooney
(74) *Attorney, Agent, or Firm*—John F. Travis (57) ABSTRACT

A capillary has an opening of a dimension for accommodating an insertion of a first and second optical fiber, a clamp to provide a clamping force to the capillary to removably couple the capillary to the clamp, and a capillary rotator removably coupled to the capillary to apply a rotational force to the capillary which is greater than the capillary force, to rotate the capillary to a selected position. An optical fiber rotator can be disposed adjacent to the first optical fiber to rotate the first optical fiber such that the first optical fiber has a selected orientation with respect to the second optical fiber.

27 Claims, 5 Drawing Sheets

METHOD AND APPARATUS FOR ALIGNING AND ORIENTING POLARIZATION MAINTAINING OPTICAL FIBERS

FIELD OF THE INVENTION

The present invention relates to fiber optic light transmission. In particular, the present invention relates to a method and an apparatus for aligning and orienting polarization maintaining optical fibers.

BACKGROUND

Optical fibers are a medium through which light signals can travel. A typical optical fiber is comprised of a glass core, for example silica glass, surrounded by an encapsulating material, also typically a glass, such as phosphate glass. A light signal travels through a light transmission pathway in the core of the optical fiber. Typically, the polarization of the light signal rotates as it travels through the optical fiber. In many instances, light signals exhibit different properties depending of the polarization of the light signal. Some optical assemblies require that an incoming light signal reach the assembly having a certain polarization in order for the assembly to operate properly. These light signals often reach the optical assembles by traveling through polaization maintaining optical fibers, which are optical fibers that have the ability to propagate light signals at a controlled polarization.

Polarization maintaining optical fibers typically contain a core and two stress rods aligned with the core, approximately 180° apart from each other. The stress rods induce a stress on the fiber, forcing the light signal to travel in a controlled polarization. Some optical assemblies require two adjacent polarized light signals to reach the optical assembly in order for the assembly to work properly. In these assemblies, the two polarization maintaining optical fibers are typically housed in a single optical fiber capillary. However, in order for both light signals to have controlled polarizations, a line connecting the stress rods from one polarization maintaining optical fiber should be disposed at an angle of approximately 90° from a line connecting the stress rods from the other polarization maintaining optical fiber.

A current method for accomplishing this task includes manually feeding two polarization maintaining optical fibers into one optical fiber capillary. This task is complicated due to the small dimensions of both the polarization maintaining optical fibers and the opening in the capillary. In addition the fibers are often brittle and should one of the fibers break during an attempt to insert a fiber into the capillary opening, the process of inserting the fibers into the capillary must be restarted. Once the fibers are inserted into the capillary, the fibers are manually rotated such that a line connecting the stress rods within one fiber is approximately 90° apart from a line connecting the stress rods within the other fiber. Again due to the small dimensions of the fibers and the capillary, manual manipulation is relatively imprecise. Once the fibers are aligned to the selected 90° orientation, the fibers are manually held into position while an epoxy cures, affixing the fibers in the selected orientation within the capillary.

BRIEF DESCRIPTION OF THE DRAWINGS

The present invention is illustrated by way of example and is not limited by the accompanying figures in which.

DETAILED DESCRIPTION OF THE INVENTION

The description discloses a method and an apparatus for aligning and orienting polarization maintaining optical fibers. The following detailed description contains numerous specific details in order to provide a more thorough understanding of the present invention. However, it will be apparent to those skilled in the art to which this invention pertains that the present invention may be practiced without these specific details. In other instances, well-known devices, methods, procedures, and individual components have not been described in detail in order to avoid obscuring the present invention.

Figures 1A, 1B:
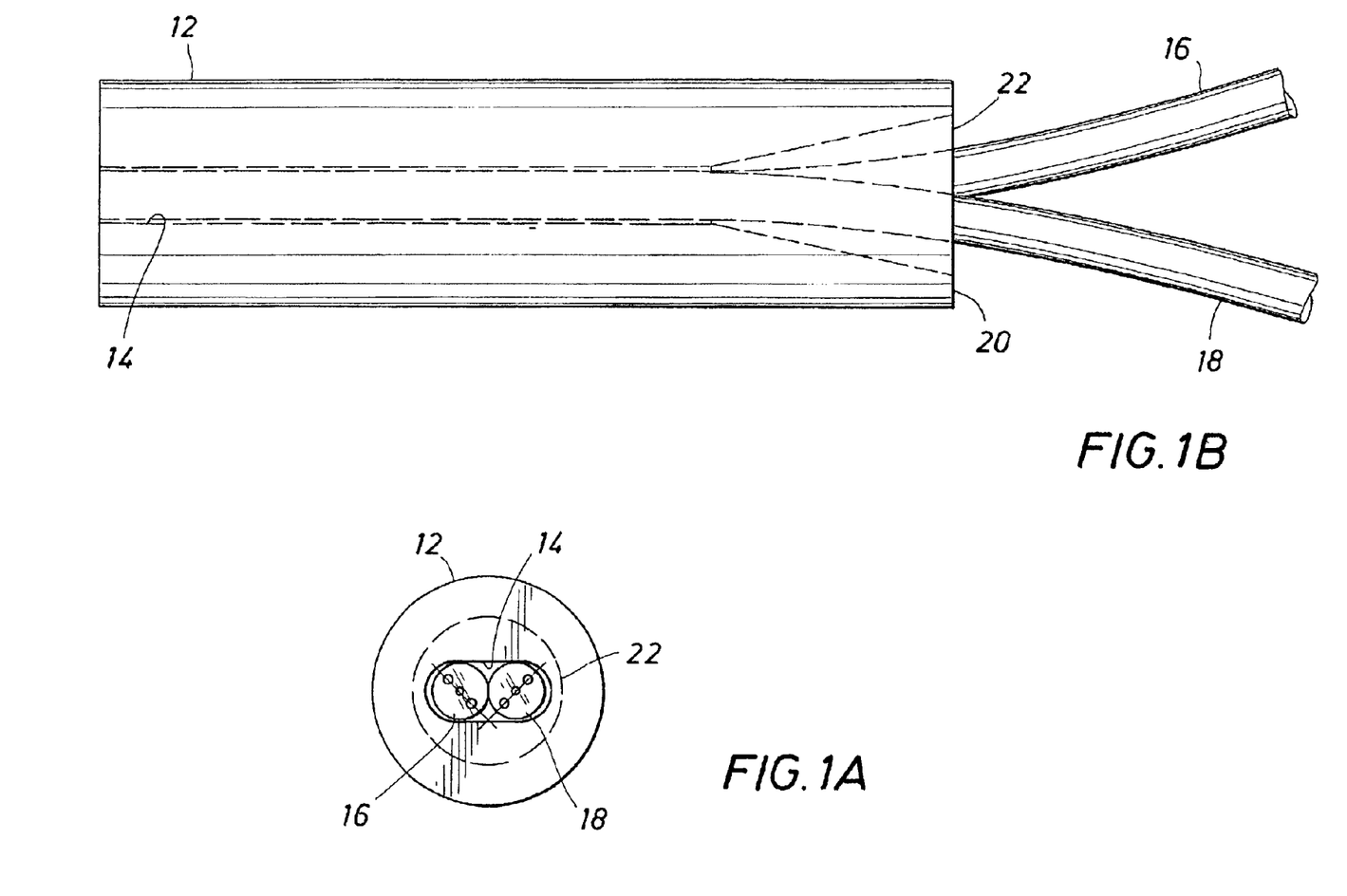
FIG. 1A shows a side view of an optical fiber capillary, wherein two polarization maintaining optical fibers have been inserted into an opening in the capillary.
FIG. 1B shows a front view of the capillary of FIG. 1A.
Figures 2A, 2C:
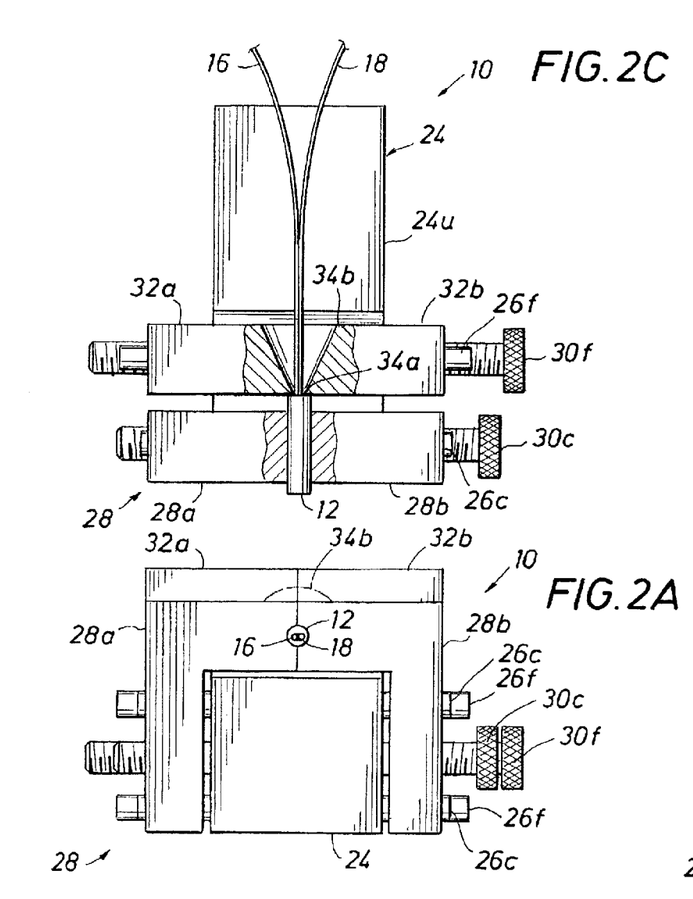
FIG. 2A shows a front view of a polarization maintaining optical fiber combining assembly.
FIG. 2C shows a top view of the polarization maintaining optical fiber combining assembly of FIG. 2A, wherein a removable funnel is in a closed position.
Figure 2B:
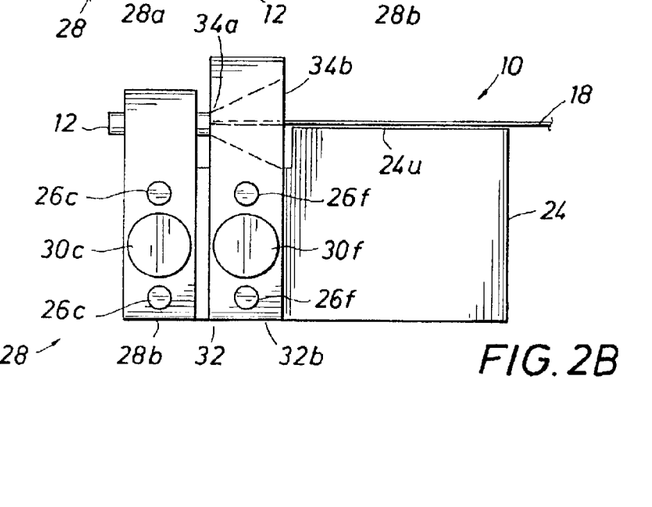
FIG. 2B shows a side view of the polarization maintaining optical fiber combining assembly of FIG. 2A.
Figure 2D:
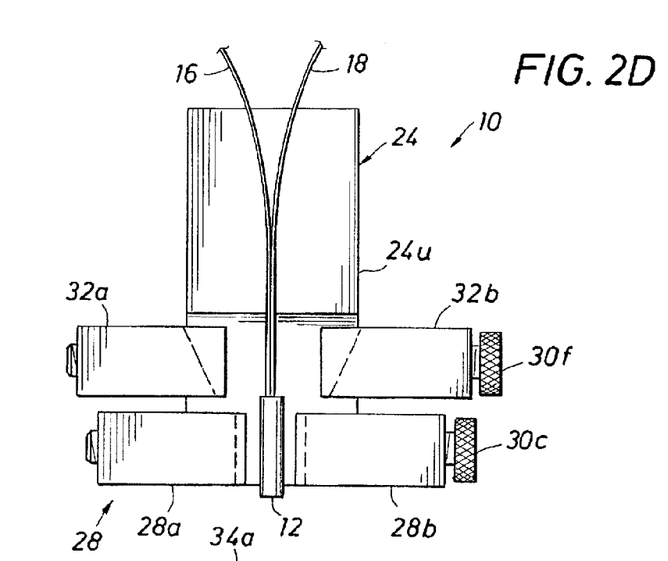
FIG. 2D shows a top view of the polarization maintaining optical fiber combining assembly of FIG. 2A, wherein a removable funnel is in an open position.

FIGS. 1A–1B shows a capillary such as an optical fiber capillary 12. The capillary 12 has a capillary opening 14 that allows for an insertion of a first and a second optical fiber, for example, a first polarization maintaining optical fiber (pm fiber) 16 and a second pm fiber 18, such that the pm fibers 16 and 18 are adjacently positioned within the capillary opening 14. In one example, the capillary 12 has an outer diameter of approximately 1.8 millimeters, with an oval opening having a major axis of approximately 250 microns and a minor axis of approximately 125 microns, although other dimensions and other opening shapes may be used. In one example, the pm fibers 16 and 18 have an outer diameter of approximately 125 microns, although other dimensions may be used. To guide the pm fibers 16 and 18, into the capillary opening 14, the capillary opening 14 gradually widens at an insertion end 20 of the capillary 12 in a funnel shape to form a circular capillary funnel opening 22 having, in one example, an outer diameter on the order of 1 millimeter, although other dimensions and other opening shapes may be used.

FIGS. 2A–2D show a pm fiber combining assembly 10. The assembly 10 includes a structure for holding the capillary 12, such as a clamp 28. In one embodiment, the assembly 10 further includes a support structure 24 having rails 26c and 26f. The clamp 28 includes a first clamp arm 28a and a second clamp arm 28b. In one embodiment, the clamp arms 28a and 28b have openings which slidably couple to the rails 26c and openings which couple to a double-threaded screw 30c. In one embodiment, the double-threaded screw 30c has right-handed threads which couple to the first clamp arm 28a and left handed threads which couple to the second clamp arm 28b or vice versa. As a result, when the double-threaded screw 30c is coupled to the clamp arms 28a and 28b, rotation of the double-threaded screw 30c causes the first clamp arm 28a to move in an opposite direction from the second clamp arm 28b, i.e. the arms 28a and 28b either move towards each other or away from each other. As the arms 28a and 28b approach each other, the capillary 12 is inserted between the arms 28a and 28b such that the double-threaded screw 30c may be rotated to secure the capillary 12 to the arms 28a and 28b.

In one embodiment, the assembly 10 also includes a removable funnel 32 disposed adjacent to the clamp 28. The removable funnel 32 has a first opening 34a and a second opening 34b. In one embodiment, the first opening 34a is similar in size to the capillary funnel opening 22 and the second opening 34b is substantially larger than the capillary funnel opening 22. For example, in one embodiment the second opening 34b has a diameter in the approximate range of 0.75 to 1.25 inches. The second opening 34b is dimensioned substantially larger than the first opening 34a, to facilitate the guiding of the pm fibers 16 and 18 into the capillary 12.

In one embodiment, the support structure 24 has an upper surface 24u disposed adjacent to the removable funnel second opening 34b. In one embodiment, the upper surface 24u has a height which positions the upper surface 24u between the midpoint of the second opening 34b and the low point of the second opening 34b. In this position, the upper surface 24u serves to further aid in guiding the pm fibers 16 and 18 into the capillary 12 and to provide support to the pm fibers 16 and 18 after insertion into the capillary 12 so that the pm fibers 16 and 18 do not bend and break.

In one embodiment, the removable funnel 32 has a first funnel portion 32a and a second funnel portion 32b. In one embodiment, the funnel portions 32a and 32b have openings which slidably couple to the rails 26f and openings which couple to a double-threaded screw 30f. The double-threaded screw 30f has right-handed threads which couples to the first funnel portion 32a and left handed threads which couples to the second funnel portion 32b or vice versa. As a result, when the double-threaded screw 30f is coupled to the funnel portions 32a and 32b, rotation of the double-threaded screw 30f causes the first funnel portion 32a to move in an opposite direction from the second funnel portion 32b, i.e. the funnel portions 32a and 32b either move towards each other or away from each other.

The rails 26c and 26f are positioned to ensure vertical alignment of the capillary funnel opening 22 with the removable funnel first opening 34a when the funnel portions 32a and 32b are slidably coupled to the rails 26f, the clamp arms 28a and 28b are slidably coupled to the rails 26c, and the capillary 12 is secured within the clamp arms 28a and 28b.

Figure 3A:
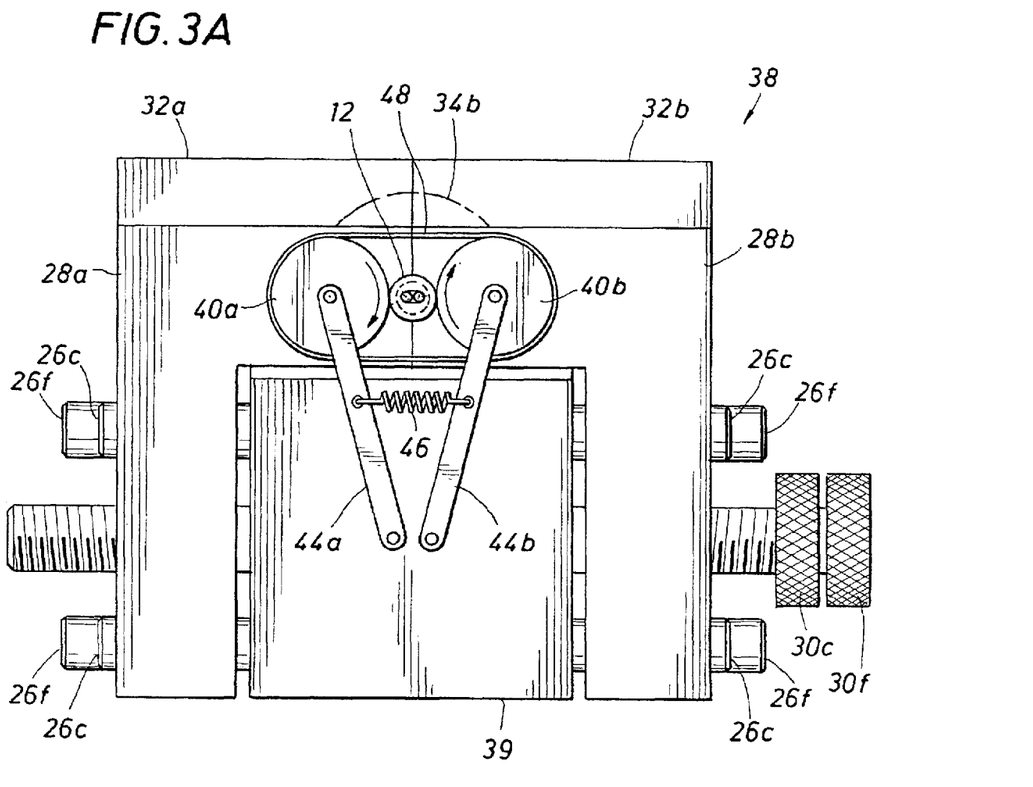
FIG. 3A shows a front view of an optical fiber capillary rotator, which rotates a capillary.

FIG. 3A shows an optical fiber capillary rotator 38 positioned adjacent to the support structure 24. When the capillary 12 has been positioned within the clamp 28, the capillary 12 can be rotated such that the capillary opening 14 can be used as a frame of reference for a later rotation of the pm fibers 16 and 18.

The capillary rotator 38 can include a first roller 40a and a second roller 40b. The rollers 40a and 40b can be secured to a main body 39 of the capillary rotator 38 by a first roller arm 44a and a second roller arm 44b respectively. A first elastic material 46, such as a spring, can be attached to both roller arms 44a and 44b to bias the roller arms 44a and 44b towards each other, causing the rollers 40a and 40b to apply a normal force to the capillary 12. A second elastic material 48, such as an elastic band, can be attached to the rollers 40a and 40b so that rotation of one of the rollers 40a or 40b causes the other roller 40a or 40b to rotate as well. Rotation of the rollers 40a and 40b produces a rotational force on the capillary 12 which is greater than a clamping force that the clamp 28 applies to the capillary 12 (see FIGS. 2A–2D). As a result, rotation of the rollers 40a and 40b can cause the capillary 12 to rotate about a center axis. The rollers 40a and 40b can be rotated until the selected orientation of the capillary 12 is achieved to serve as a frame of reference for the later rotation of the pm fibers 16 and 18. For example, when the capillary opening 14 is an oval, positioning the major axis of the oval to a horizontal orientation provides a good frame of reference for the later rotation of the pm fibers 16 and 18.

Figure 3B:
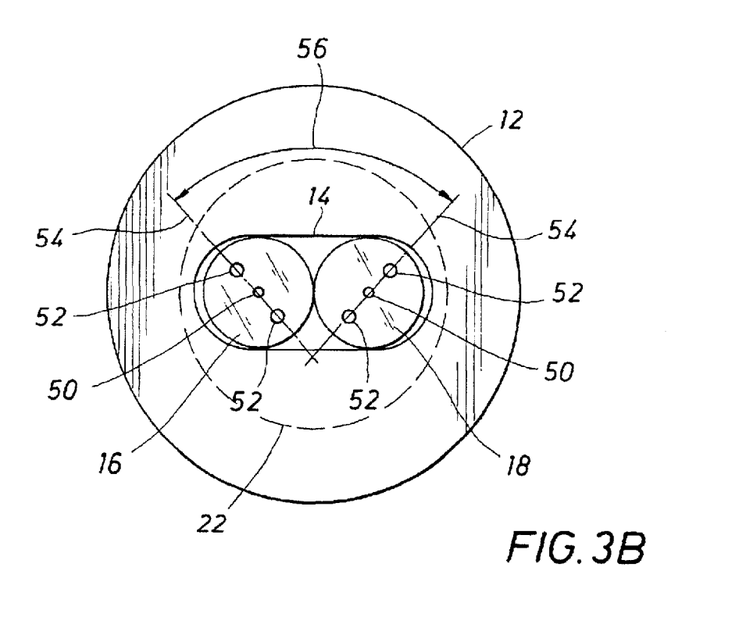
FIG. 3B shows an enlarged view of the capillary shown in FIG. 3A.

FIG. 3B shows some of the internal components of pm fibers 16 and 18. Some optical assemblies require that two adjacently positioned incoming light signals reach the optical assembly at a particular polarization in order for the optical assembly to operate properly. This is typically accomplished by utilizing pm fibers, such as pm fibers 16 and 18, housed within a single capillary, such as capillary 12.

In a typical optical fiber, the polarization of a light signal rotates as the light signal travels through the optical fiber. However, pm fibers, such as pm fibers 16 and 18 force light signals to propagate at a controlled polarization.

Pm fibers 16 and 18 each contain a core 50, through which light signals travel, and two stress rods 52 aligned with the core 50, spaced approximately 180° apart from each other so that the stress rods 52 and the core 50 form a line 54. The stress rods 52 induce a stress on the pm fiber 16 or 18, forcing light signals to travel through the pm fiber 16 or 18 in a controlled polarization.

In situations where the pm fibers 16 and 18 are positioned adjacently within a single capillary 12, as in shown in FIG. 3A–3B, the lines 54 are oriented at an angle 56 of approximately 90° from each other in order for both pm fibers 16 and 18 to transmit light signals that each have a controlled polarization. In one embodiment, the lines 54 are oriented at an angle 56 in the approximately range of 87° to 93°. Rotating the capillary 12, which contains the pm fibers 16 and 18, to a selected position, as is described above, enables the capillary opening 14 to act as a flame of reference for the orienting of the lines 54 with respect to each other.

FIGS. 4A–4D shows a pm fiber rotator 58, for rotating the pm fibers 16 and 18 such that lines 54 can be positioned to a selected angle 56 with respect to each other. In one embodiment, the pm fiber rotator 58 includes a mounting block 60. The mounting block is positioned adjacent to the support structure 24 (not shown) and houses a pm fiber rotator shaft 62. In one embodiment, the shaft 62 is held within the mounting block 60 by a ball and spring plunger 76 that couples with a groove 78 in the shaft 62. The shaft 62 is connected to a pm fiber rotator knob 64. The shaft 62 and the knob 64 have openings, 66 and 68 respectively, down their center of axes. The shaft opening 66 and the knob opening 68 are shaped and dimensioned such that when the pm fiber 16 is placed in the openings 66 and 68, the pm fiber 16 is concentric with the shaft 62 and the knob 64. In one embodiment the openings 66 and 68 are v-grooves. The v-grooves may be formed, for example, by machining two oppositely directed 45° angled cuts, which meet at a point to form a v-shaped groove, into the shaft 62 and the knob 64.

The knob 64 can have a first knob portion 64a and a second knob portion 64b. The knob portions 64a and 64b can be attached by a connector 70, such as a hinge, that enables the knob portions 64a and 64b to separate, for example by moving knob portion 64a in a direction of arrow 72. As a result, knob 64 can be positioned in an opened position or a closed position. A device 74, such as a latch, can enable the knob 64 to be held in the closed position or to be released into the opened position. The first knob portion 64a can contain a compression element 72 that holds the pm fiber 16 against the opening 68 when the device 74 holds the knob 64 in the closed position, such that the pm fiber 16 can only move in a rotational direction.

Figure 4A:
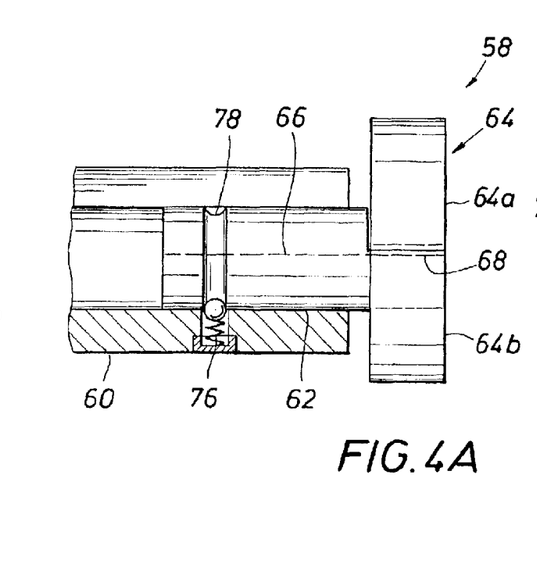
FIG. 4A shows a front view of a polarization maintaining optical fiber rotator comprising a polarization maintaining optical fiber shaft and a polarization maintaining optical fiber knob.
Figure 4B:
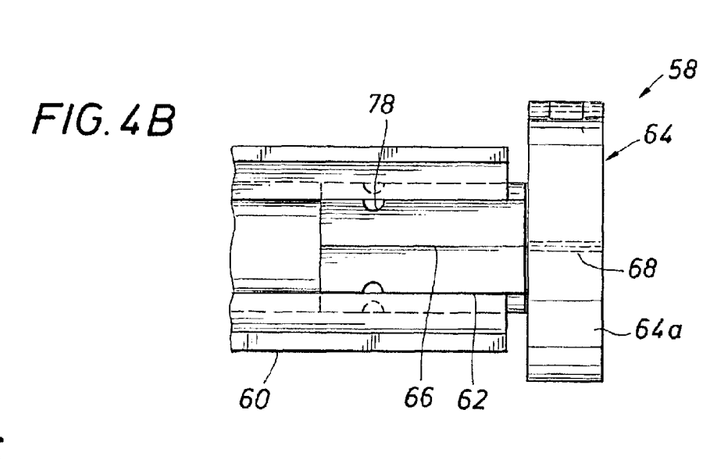
FIG. 4B shows a top view of the polarization maintaining optical fiber rotator of FIG. 4A.
Figure 4C:
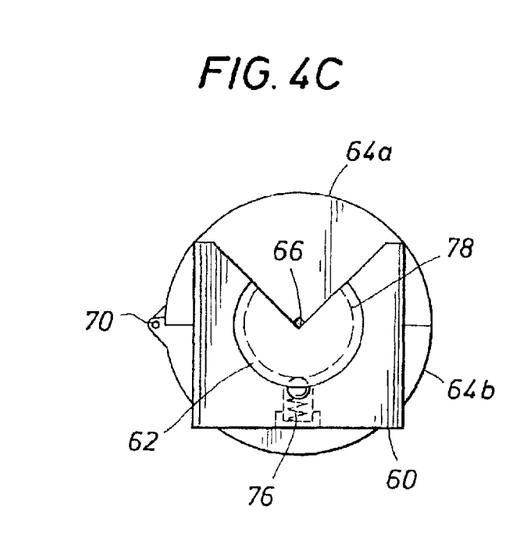
FIG. 4C shows a side view of the shaft of FIG. 4A.
Figure 4D:
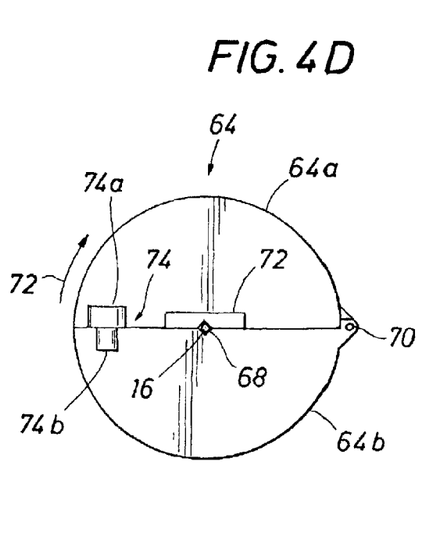
FIG. 4D shows a side view of the knob of FIG. 4A.

In one embodiment, the first knob portion 64a contains a magnetic block 74a and the second knob portion 64b contains a plug 74b, for example a steel plug, which is magnetically attracted to the magnetic block 74a, such that the plug 74b and the magnetic block 74a form a magnetic latch.

When the pm fibers 16 and 18 have been inserted into the capillary 12 and it has been determined that the pm fibers 16 and 18 are not positioned in the selected orientation with respect to each other, the pm fiber rotator 58 can be positioned adjacent to the support structure 24. The device 74, such as a magnetic latch, is then released so that the knob 64 can be positioned in the opened position. The pm fiber 16 can then be placed in openings 66 and 68. The knob 64 can then be placed in the closed position, causing the compression element 72 to hold the pm fiber 16 against the opening 68 such that the pm fiber 16 can only move in a rotational direction. Since the pm fiber 16 is positioned concentric with the knob 64, rotating the knob 64 causes the pm fiber 16 to rotate about its center of axis. If the capillary 12 has been rotated to its selected position, the capillary opening 14 can be used as a frame of reference for determining when the pm fiber 16 has been rotated to its selected position. If needed, the process can be repeated to rotate the pm fiber 18 to its selected position.

When the pm fibers 16 and 18 are positioned to the selected orientation, i.e. when the lines 54 form an angle 56 of approximately 90°, the pm fiber rotator 58 is used to hold the pm fibers 16 and 18 in position while the pm fibers 16 and 18 are affixed to the capillary 12, such as by applying and then curing an epoxy.

The knob 64 can have an outer diameter which is significantly greater than the outer diameter of the pm fibers 16 and 18. As a result, it is much easier and more precise to manipulate of the knobs than it is to manipulate the pm fibers 16 and 18 directly. In addition, the pm fiber rotator 58 is much less likely to move during epoxy curing than is a manual holding of the pm fibers 16 and 18 during epoxy curing.

Figure 5:
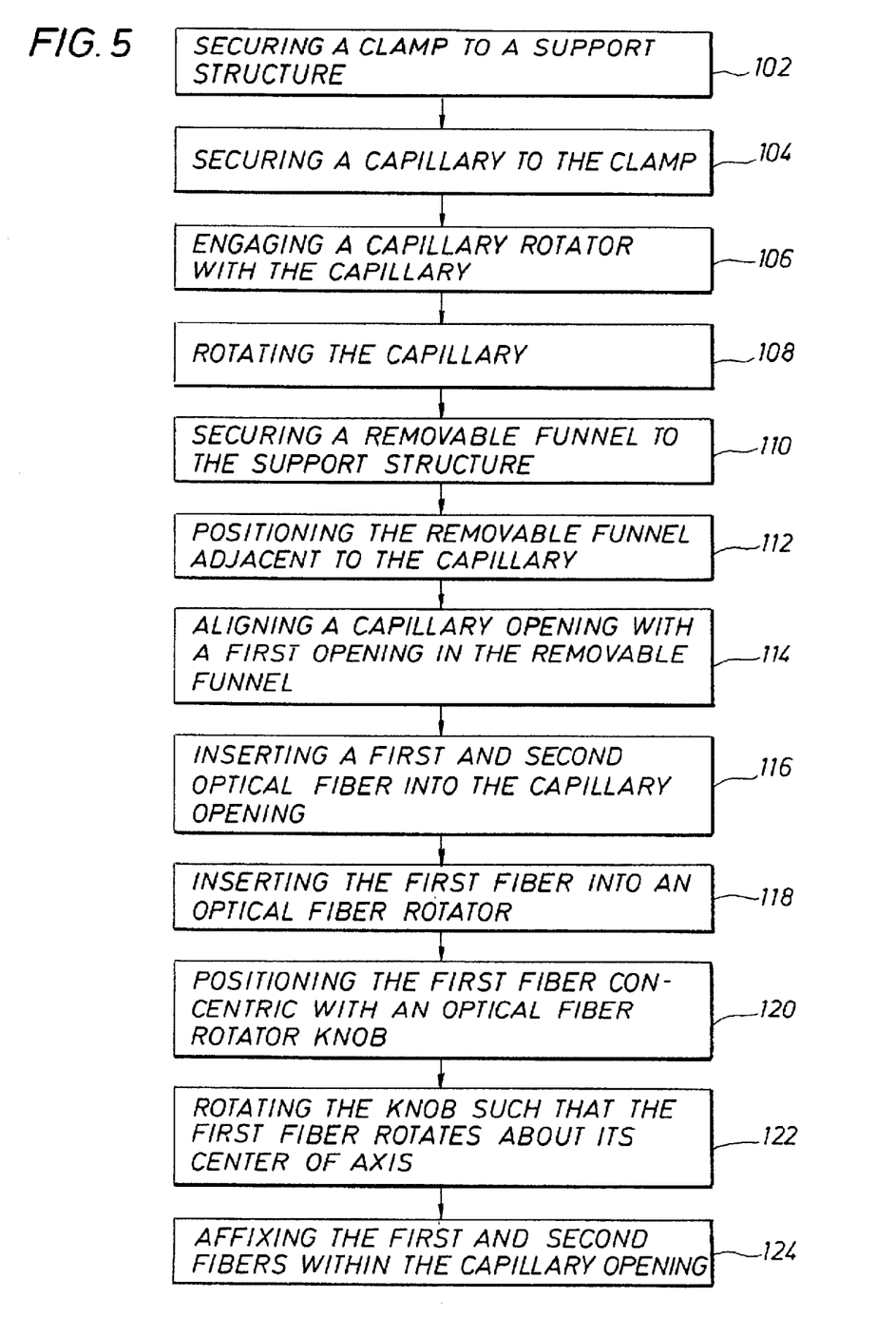
FIG. 5 shows a flow chart of a method of an embodiment.

FIG. 5 shows a flow chart for using the devices of FIGS. 1–4D. Block 102 shows a securing of a structure for holding the capillary 12, such as a clamp 28 to the support structure 24. In one embodiment, the support structure 24 includes the rails 26c and the clamp 28 includes the clamp arms 28a and 28b. In this embodiment, the clamp arms 28a and 28b have openings which slidably couple to the rails 26c and openings which couple to the double-threaded screw 30c. In one embodiment, the double-threaded screw 30c has right-handed threads which couple to the first clamp arm 28a and left handed threads which couple to the second clamp arm 28b. As a result, when the double-threaded screw 30c is coupled to the clamp arms 28a and 28b, a clockwise rotation of the double-threaded screw 30c causes the first clamp arm 28a to move in an opposite direction from the second clamp arm 28b, i.e. the arms 28a and 28b move towards each other, thus securing the clamp 28 to the support structure 24.

Block 104 shows a securing of the capillary 12 to the clamp 28. As the arms 28a and 28b approach each other, the capillary 12 can be inserted between the arms 28a and 28b such that the capillary 12 is loosely held within the arms 28a and 28b. In one embodiment, the capillary 12 is placed within the arms 28a and 28b such that a portion of the capillary 12 protrudes from the arms 28a and 28b. The double-threaded screw 30c may be further rotated in the clockwise direction to secure the capillary 12 within the arms 28a and 28b.

Block 106 shows an engaging of the capillary rotator 38 with the capillary 12. In one embodiment, the capillary rotator 38 has openings which slidably couple to a post which is attached to the support structure 24. In this embodiment, the post is aligned with the rails 26c to ensure vertical alignment of the capillary rotator 38 with the capillary 12. In one embodiment, the capillary rotator 38 includes the first and second rollers 40a and 40b which are biased towards each other by the first elastic material 46. In one embodiment, as the capillary rotator 38 approaches the capillary 12, a force, which is greater than a biasing force produced by the first elastic material 46, is exerted on the rollers 40a and 40b to move the rollers 40a and 40b apart from each other to allow the portion of the capillary 12 which protrudes from the arms 28a and 28b to be disposed between the rollers 40a and 40b. The rollers 40a and 40b may then be released, such that the first elastic material 46 biases the rollers 40a and 40b towards each other, causing the rollers 40a and 40b to apply a normal force to the capillary 12.

Block 108 shows a rotating of the capillary 12. In one embodiment, a second elastic material 48, such as an elastic band, can be attached to the rollers 40a and 40b such that rotation of one of the rollers 40a or 40b causes the other roller 40a or 40b to rotate as well. Rotation of the rollers 40a and 40b produces a rotational force on the capillary 12 which is greater than the clamping force that the clamp 28 applies to the capillary 12. As a result, rotation of the rollers 40a and 40b can cause the capillary 12 to rotate about a center axis. The rollers 40a and 40b can be rotated until a selected orientation of the capillary opening 14 is achieved. For example, when the capillary opening 14 is an oval, positioning the major axis of the oval to the horizontal orientation provides a good frame of reference for the later rotation of the pm fibers 16 and 18.

Block 110 shows a securing of the removable funnel 32 to the support structure 24. In one embodiment, the support structure 24 includes the rails 26f and the removable funnel 32 includes the first and second funnel portions 32a and 32b. In this embodiment, the funnel portions 32a and 32b have openings which slidably couple to the rails 26f and openings which couple to the double-threaded screw 30f. In one embodiment, the double-threaded screw 30f has right-handed threads which couple to the first funnel portion 32a and left handed threads which couple to the second funnel portion 32b. As a result, when the double-threaded screw 30f is coupled to the funnel portions 32a and 32b, a clockwise rotation of the double-threaded screw 30f causes the first funnel portion 32a to move in an opposite direction from the second funnel portion 32a, i.e. the funnel portions 32b and 32b move towards each other, thus securing the removable funnel 32 to the support structure 24.

Block 112 shows a positioning of the removable funnel 32 adjacent to the capillary 12. In one embodiment, the rails 26c and 26f are positioned to ensure that the removable funnel 32 and the capillary 12 are adjacently positioned when the capillary 12 and the removable funnel 32 are secured to the support structure 24. Block 114 shows an aligning of the capillary opening 14 with the first opening 34a in the removable funnel 32. In one embodiment, the rails 26c and 26f are vertically positioned to ensure that rotation of double threaded screw 30f aligns the first opening 34a in the removable funnel 32 with the capillary opening 14 when the capillary 12 is secured to the support structure 24.

Block 116 shows an inserting of a first and a second optical fiber, for example, pm fibers 16 and 18 into the capillary 12. The first pm fiber 16 can be inserted into the capillary 12 by threading the first pm fiber 16 into the removable funnel second opening 34b. The removable funnel 32 then guides the first pm fiber 16 into the capillary opening 14. The second pm fiber 18 can then be similarly threaded into the removable funnel second opening 34b, which guides the second pm fiber into the capillary opening 14 such that the pm fibers 16 and 18 are adjacently positioned within the capillary 12.

Block 118 shows an inserting of the first pm fiber 16 into the pm fiber rotator 58. In one embodiment, the pm fiber rotator 58 is positioned adjacent to the support structure 24 and includes the shaft 62 and the knob 64. The shaft 62 and the knob 64 have openings, 66 and 68 respectively, down their center of axes. The knob includes the first knob portion 64a and the second knob portion 64b. The knob portions 64a and 64b can be attached by the connector 70, such as a hinge, that enables the knob portions 64a and 64b to have opened and closed positions. In one embodiment, the first knob portion 64a contains the magnetic block 74a and the second knob portion 64b contains the plug 74b, for example a steel plug, which is magnetically attracted to the magnetic block 74a, such that the plug 74b and the magnetic block 74a form a magnetic latch. When the pm fibers 16 and 18 are adjacently disposed within the capillary 12, a force can be exerted on the knob portions 64a and 64b to overcome the force of the latch to separate the knob portions 64a and 64b, allowing the first pm fiber to be inserted into the openings 66 and 68 respectively, in the shaft 62 and the knob 64. The first knob portion 64a can contain the compression element 72 to hold the pm fiber 16 against the knob opening 68 when the device 74 holds the knob 64 in the closed position, such that the pm fiber 16 can only move in a rotational direction.

Block 120 shows a positioning of the first pm fiber 16 concentric with the knob 64. In one embodiment, the shaft opening 66 and the knob opening 68 are shaped and dimensioned such that when the pm fiber 16 is placed in the openings 66 and 68 respectively, of the shaft 62 and the knob 64, the pm fiber 16 is concentric with the shaft 62 and the knob 64. In one embodiment the openings 66 and 68 are v-grooves. The v-grooves may be formed, for example, by machining two oppositely directed 45° angled cuts, which meet at a point to form a v-shaped groove, into the shaft 62 and the knob 64.

Block 122 shows a rotating of the knob such that the first fiber 16 rotates about its center of axis. Since the pm fiber 16 is positioned concentric with the knob 64, rotating the knob 64 causes the pm fiber 16 to rotate about its center of axis. In one embodiment the pm fiber 16 is rotated until the lines 54 connecting the stress rods 52 in the pm fibers 16 and 18 form the angle 56 in the approximate range of 87° to 93°.

Block 124 shows an affixing of the fibers 16 and 18 within the capillary opening 14. When the selected angle for the angle 56 has been obtained, the fibers 16 and 18 can be affixed within the capillary 12, for example by distributing an epoxy within the capillary opening 14 and curing the epoxy. In one embodiment the pm fiber rotator 58 secures the first pm fiber 16 during the affixing such that the selected angle for the angle 56 does not change during the affixing.

Embodiments of the invention can include a removable funnel having an opening which is significantly larger than the opening in a capillary to facilitate an insertion of pm fibers into the capillary. Embodiments of the invention also include a pm fiber capillary rotator which rotates the capillary so that the opening in the capillary can be used as a frame of reference for a later rotation of the pm fibers. Embodiments of the invention also include a pm fiber rotator that rotates a pm fiber so that the pm fiber can be properly oriented with respect to an adjacent pm fiber and, once properly oriented, the rotator holds the pm fiber in place during an affixing of the fiber within the capillary.

Although specific embodiments, including specific parameters, methods, and materials have been described, various modifications to the disclosed embodiments will be apparent to one of the ordinary skill in the art upon reading this disclosure. Therefore, it is to be understood that such embodiments are merely illustrative of and not restrictive on the broad invention and that this invention is not limited to the specific embodiments shown and described.

We claim:

1. An apparatus comprising:
    a capillary support for holding a capillary;
    a capillary rotator that adjusts an orientation of an opening within the capillary;
    an optical fiber rotator that adjusts a polarization of a first optical fiber and a second optical fiber when the optical fibers are adjacently disposed within the capillary; and
    a removable funnel having an opening positioned adjacent to the capillary opening.

2. The apparatus of claim 1 wherein the capillary opening is wider at an insertion end of the capillary to form a capillary funnel opening and the removable funnel has a first opening similar in size to the capillary funnel opening and a second opening which is substantially larger than the capillary funnel opening.

3. The apparatus of claim 2 further comprising a support structure which has at least one rail slidably coupled to the capillary support and at least one rail slidably coupled to the removable funnel, wherein the rails are positioned to ensure that the capillary funnel opening is aligned with the first opening in the removable funnel when the capillary is secured to the capillary support.

4. The apparatus of claim 1 wherein the optical fiber rotator includes:
    an optical fiber rotator knob removably mounted adjacent to the first optical fiber; and
    a optical fiber rotator shaft connected to the knob, the shaft and the knob having an opening to accept the first optical fiber such that the first optical fiber is concentric with the knob and rotation of the knob causes the first optical fiber to rotate about its center of axis.

5. The apparatus of claim 4 wherein the knob has a first knob portion and a second knob portion connected by a connector to allow the knob to be positioned in an opened position or a closed position, wherein a device releasably secures the knob in the closed position and the first knob portion includes a compression element to secure the first optical fiber to the knob opening when the knob is in the closed position.

6. The apparatus of claim 5 wherein the shaft opening and the knob opening are v-grooves.

7. An apparatus comprising:
a capillary having an opening of a dimension for accommodating a first polarization maintaining optical fiber and a second polarization maintaining optical fiber;
a clamp to provide a clamping force to the capillary to removably couple the capillary to the clamp;
a main body positioned adjacent to the clamp;
a first and a second roller, connected to the main body, to removably engage the capillary to rotate the capillary, the main body and the rollers comprising an optical fiber capillary rotator; and
a polarization maintaining optical fiber rotator knob having a shaft, wherein the knob and shaft each have an opening to accept the first optical fiber such that the first optical fiber is concentric with the knob and rotation of the knob causes the first optical fiber to rotate about its center of axis, the knob and shaft comprising a polarization maintaining optical fiber rotator which is mounted adjacent to the first optical fiber.

8. The apparatus of claim 7 further comprising a removable funnel, wherein the capillary opening is wider at an insertion end of the capillary to form a capillary funnel opening and the removable funnel has a first opening similar in size to the capillary funnel opening and a second opening which is substantially larger than the capillary funnel opening, the removable funnel first opening being positioned adjacent to the capillary funnel opening when the capillary is coupled to the clamp.

9. The apparatus of claim 8 further comprising a support structure which has at least one rail slidably coupled to the clamp and at least one rail slidably coupled to the removable funnel, wherein the rails are positioned to ensure that the capillary funnel opening is aligned with the removable funnel first opening when the capillary is coupled to the clamp.

10. The apparatus of claim 7 wherein the capillary rotator further includes:
a first elastic material to bias the rollers towards the capillary such that the rollers apply a normal force to the capillary; and
a second elastic material coupling the first roller to the second roller such that a rotation of one of the rollers causes the other roller to rotate and the rotation of the rollers causes the capillary to rotate about its center of axis when the rollers are engaged with the capillary.

11. The apparatus of claim 7 wherein the knob has a first knob portion and a second knob portion connected by a connector to allow the knob to be positioned in an opened position or a closed position, wherein a device releasably secures the knob in the closed position and the first knob portion includes a compression element to secure the first optical fiber to the knob opening when the knob is in the closed position, and wherein the shaft opening and the knob opening are v-grooves.

12. A method comprising:
securing a capillary to a capillary support;
rotating the capillary by use of a capillary rotator such that an opening in the capillary is positioned in a selected orientation;
inserting a first and a second optical fiber into the opening in the capillary such that the first and second optical fibers are adjacently positioned;
rotating the first optical fiber by use of an optical fiber rotator assembly such that the first and second optical fibers have a selected polarization; and
positioning a removable funnel adjacent to the capillary when the capillary is secured within the capillary support.

13. The method of claim 12 wherein positioning the removable funnel adjacent to the capillary includes aligning a first opening in the removable funnel with the capillary opening.

14. The method of claim 12 wherein:
securing the capillary to the capillary support includes securing the capillary support to a support structure; and
positioning the removable funnel adjacent to the capillary includes securing the removable funnel to the support structure.

15. The method of claim 13 wherein securing the capillary to the capillary support includes rotating a double threaded screw which engages a first capillary support arm and a second capillary support arm such that rotation of the double threaded screw causes the first capillary support arm to move in an opposite direction with respect to the second capillary support arm, and wherein a first funnel portion is secured to a second funnel portion by rotating a double threaded screw which engages a first funnel portion and a second funnel portion and causes the first funnel portion to move in an opposite direction with respect to the second funnel portion.

16. A method comprising:
securing a capillary to a clamp;
engaging the capillary with a capillary rotator;
rotating the capillary by use of the capillary rotator such than an opening in the capillary is positioned in a selected orientation;
inserting a first optical fiber and a second optical fiber into the opening in the capillary such that the first and second optical fibers are adjacently positioned;
inserting the first optical fiber into a optical fiber rotator;
positioning the first optical fiber concentric with the optical fiber rotator;
rotating the optical fiber rotator such that the first and second optical fibers have a selected polarization; and
positioning a removable funnel adjacent to the capillary when the capillary is secured within the clamp.

17. The method of claim 16 wherein positioning the removable funnel adjacent to the capillary includes aligning a first opening in the removable funnel with the capillary opening.

18. The method of claim 17 wherein:
securing the capillary to the clamp includes securing the clamp to a support structure, wherein the support structure has at least one rail slidably coupled to the clamp; and
positioning the removable funnel adjacent to the capillary includes securing the removable funnel to the support structure, wherein the support structure has at least one rail slidably coupled to the removable funnel.

19. An apparatus comprising:
a capillary support for holding a capillary;
a capillary rotator that adjusts an orientation of an opening within the capillary, the capillary rotator having a main body positioned adjacent to the capillary support, the capillary rotator having a first and second roller connected to the main body, the rollers to removably engage the capillary to rotate the capillary; and an optical fiber rotator that adjusts a polarization of a first optical fiber and a second optical fiber when the optical fibers are adjacently disposed within the capillary.

20. The apparatus of claim 19 wherein the capillary rotator further includes a first elastic material to bias the rollers towards the capillary such that the rollers apply a normal force to the capillary.

21. The apparatus of claim 20 wherein the capillary rotator further includes a second elastic material coupling the first roller to the second roller such that a rotation of one of the rollers causes the other roller to rotate and the rotation of the rollers causes the capillary to rotate about its center of axis when the rollers are engaged with the capillary.

22. A method comprising:

securing a capillary to a capillary support;

using a capillary rotator to position an opening in the capillary in a selected orientation by rotating a first roller or a second roller of the capillary rotator in response to rotation of the second roller or the first roller, respectively, the rotation of the first and the second rollers causing the rotation of the capillary;

inserting a first and a second optical fiber into the opening in the capillary such that the first and second optical fibers are adjacently positioned; and rotating the first optical fiber by use of an optical fiber rotator assembly such that the first and second optical fibers have a selected polarization, wherein rotating the capillary includes rotating a first or second roller of the capillary rotator such that rotation of one of the rollers causes rotation of the other roller, and the rotation of the rollers causes the capillary to rotate.

23. A method comprising:

securing a capillary to a capillary support;

rotating the capillary by use of a capillary rotator such that an opening in the capillary is positioned in a selected orientation;

inserting a first and a second optical fiber into the opening in the capillary such that the first and second optical fibers are adjacently positioned;

rotating the first optical fiber by use of an optical fiber rotator assembly such that the first and second optical fibers have a selected polarization, rotating the first optical fiber including inserting the first optical fiber into an optical fiber rotator, the optical fiber rotator having a optical fiber rotator knob, positioning the first optical fiber concentric with the knob, and rotating the knob to rotate the first optical fiber about its center of axis.

24. The method of claim 23 wherein rotating the first optical fiber includes:

separating a first knob portion from a second knob portion;

inserting the first optical fiber into an opening in the knob; and securing the first optical fiber between the first and second knob portions.

25. The method of claim 24 further including affixing the first and second optical fibers to the capillary opening after the first and second optical fibers have been positioned in the selected polarization.

26. A method comprising:

securing a capillary to a clamp;

engaging the capillary with a capillary rotator;

rotating the capillary by use of the capillary rotator to position an opening in the capillary in a selected orientation;

inserting a first optical fiber and a second optical fiber into the opening in the capillary to adjacently position the first and second optical fibers by separating an optical fiber rotator first knob portion from an optical fiber rotator second knob portion, inserting the first optical fiber into an opening in the knob, and securing the first optical fiber between the first and second knob portions;

inserting the first optical fiber into a optical fiber rotator;

positioning the first optical fiber concentric with the optical fiber rotator;

rotating the optical fiber rotator such that the first and second optical fibers have a selected polarization.

27. The method of claim 26, further comprising:

affixing the first and second optical fibers to the capillary opening after the first and second optical fibers have been positioned in the selected polarization.

* * * * *